United States Patent [19]
Leidy et al.

[11] Patent Number: 6,035,995
[45] Date of Patent: *Mar. 14, 2000

[54] LEHR LOADER

[75] Inventors: D. Wayne Leidy, Perrysburg; Frank J. DiFrank, Toledo, both of Ohio; Ronald P. Warnecke, Danville, Va.

[73] Assignee: Owens-Brockway Glass Container Inc., Toledo, Ohio

[ * ] Notice: This patent is subject to a terminal disclaimer.

[21] Appl. No.: 09/261,649

[22] Filed: Mar. 3, 1999

Related U.S. Application Data

[63] Continuation of application No. 08/854,042, May 8, 1997, Pat. No. 5,893,449.

[51] Int. Cl.⁷ .................................................. B65G 25/00
[52] U.S. Cl. ........................................... 198/430; 198/740
[58] Field of Search .................................... 198/427, 430, 198/738, 740, 743, 744, 745

[56] References Cited

U.S. PATENT DOCUMENTS

| | | | |
|---|---|---|---|
| 4,660,711 | 4/1987 | Alonso et al. | 198/430 |
| 5,893,449 | 4/1999 | Leidy et al. | 198/430 |

FOREIGN PATENT DOCUMENTS

| | | |
|---|---|---|
| 708 266 A1 | 4/1996 | European Pat. Off. . |
| 2174667 | 5/1985 | United Kingdom . |

*Primary Examiner*—James R. Bidwell

[57] ABSTRACT

A lehr loader (20) for transferring a line of freshly formed glass containers (C) on a cross-conveyor (XC) transversely of the cross-conveyor into an annealing lehr (L). The lehr loader has a superimposed stack of three carriages (48, 76, 94), the lowermost carriage (48) being supported on a frame (22) and being movable longitudinally in a horizontal plane with respect to the frame toward and away from the lehr. The intermediate carriage (76) is supported on the lowermost carriage (48) and is movable longitudinally with the lowermost carriage and is movable laterally in a horizontal plane with respect to the lowermost carriage. The uppermost carriage (94) is supported on the intermediate carriage (76) and is movable horizontally with the intermediate carriage and vertically with respect to the intermediate carriage. An enclosed linear actuator (50) in the form of an enclosed ball screw mechanism with a housing (56) is attached to the frame, and a reversible, co-axial a.c. servo motor (52) is provided to cause reciprocation of the lowermost carriage. An enclosed linear actuator (78) in the form of an enclosed ball screw mechanism with a housing (82) attached to the lowermost carriage (76) and a co-axial reversible, a.c. servo motor (80) is provided to cause reciprocation of the intermediate carriage. An enclosed linear actuator (96) in the form of an enclosed ball screw mechanism with a housing (102) attached to the intermediate carriage (76) and a reversible, a.c. servo motor (98) is provided to cause reciprocation of the uppermost carriage (94).

16 Claims, 12 Drawing Sheets

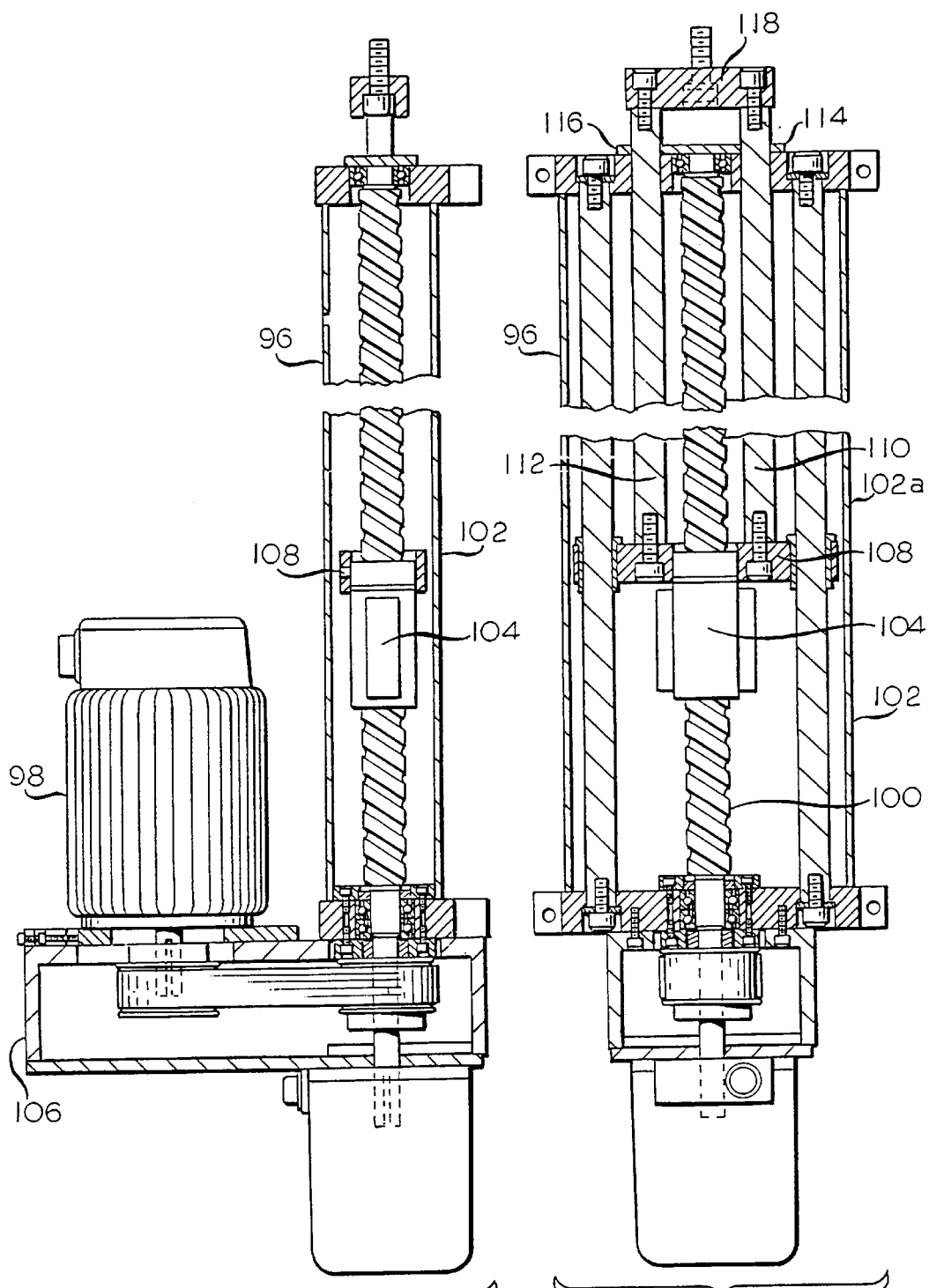

LEHR LOADER

This application is a continuation of 08/854,042, filed May 8, 1997 now Pat. No. U.S. 5,893,449.

BACKGROUND OF THE INVENTION

1. Field of the Invention

This invention relates to a transfer device for transferring articles disposed in a linear array on a conveyor transversely of the conveyor into an article processing unit. More particularly, this invention relates to a transfer device of the foregoing character for transferring freshly formed glass containers to the upper horizontal surface of a moving conveyor of an annealing lehr, namely, a type of transfer device often called a lehr loader or a stacker.

2. Description of the Prior Art

U.S. Pat. No. 5,044,488 (Bolin) discloses a lehr loader or stacker having a vertical series of driven carriages, the lowermost of which is supported by a support structure at an elevation above the floor of the plant in which the lehr loader is installed. The lowermost carriage is movable toward an adjacent annealing lehr to advance a linear series of glass containers on a conveyor, described in the reference as a cross-conveyor, positioned between the stacker and the lehr, transversely of the cross-conveyor into the lehr. An intermediate carriage is mounted on the lowermost carriage. The intermediate carriage is movable with the lowermost carriage toward and away from the lehr and is independently movable with respect to the lowermost carriage in a direction parallel to the direction of movement of the cross-conveyor to keep new containers on the cross-conveyor from piling up against a pusher bar carried by a third carriage during the motion of the lowermost carriage toward the lehr. The third carriage, which is the uppermost carriage in the series, is mounted above the intermediate carriage and is movable with the lowermost carriage and the intermediate carriage and is movable in a vertical direction independently of the intermediate carriage and the lowermost carriage to elevate the pusher bar above the tops of incoming containers on the cross-conveyor during the return of the pusher bar to a start position. The motion of each of the carriages of the stacker of the aforesaid U.S. Pat. No. 5,044,488 is actuated by an axially fixed, rotatable screw drive carried by the underlying carriage, or the support structure in the case of drive for the lowermost carriage, and the rotatable screw is rotatable in a nut that is fixed to the drive carriage.

The rotating screw carriage drives of a stacker according to the aforesaid U.S. Pat. No. 5,044,488 have many operating advantages over other lehr loader carriage drive techniques, such as hydraulic or pneumatic cylinders or motors, in that rotating screw drives have higher starting torques and are less jerky and more controllable in their motions. Unfortunately, the environment of a glass container manufacturing facility is quite hostile to rotating screw drives of the type described in the aforesaid U.S. Pat. No. 5,044,488, due to dust or other particles that may contaminate the nut contacting surfaces of the rotatable screws, or the tendency of the rotatable screws to sling lubricant outwardly when rotating at the speeds of rotation needed for proper operation of a lehr loader, and/or the high temperatures that are inherently present in the operation of a lehr loader. Because of such problems, the inventor of the aforesaid U.S. Pat. No. 5,044,488 subsequently patented a lehr loader that substituted endless belt drives for the rotatable screw drives of the aforesaid U.S. Pat. No. 5,044,488, as is shown in U.S. Pat. No. 5,472,077 (Bolin). However, the use of endless drives to drive the carriages of a lehr loader introduces other problems into the operation of a lehr loader, such as the inherent low starting torque of such drives and problems encountered in accurately controlling the positions of the movable carriages due to the stretching of belts in a belt-driven system or the backlash between chains and drive sprockets in a chain-driven system.

Other lehr loaders are disclosed in U.S. Pat. Nos. 4,067,434 (Mumford) and 3,184,031 (Dunlap), which were assigned to the assignee of this application or one of its predecessors, the disclosure of each of which is incorporated by reference herein, and in published UK Patent application GB 2174667A.

BRIEF DESCRIPTION OF THE INVENTION

The aforesaid and other problems associated with prior art lehr loader devices are overcome by a lehr loader according to the present invention in which the reciprocating motion of each of three superimposed movable carriages is actuated by an axially fixed, rotatable screw that rotates in a nut which drives a spaced apart pair of parallel drive rods. The rotatable screw and nut are enclosed within a housing, and the drive rods extend from the housing, through appropriate seals to maintain lubricant within the housing and prevent dirt or other debris from entering into the housing. The housing for each rotatable screw and drive nut assembly is secured to the underlying carriage, or to the support structure in the case of the drive assembly for the lowermost movable carriage, and the free ends of the drive rods are secured to the overlying movable carnage.

The use of enclosed rotatable screw and drive nut assemblies in moving the movable carriages of a lehr loader according to the present invention makes it possible to achieve the gentle handling and cycle controllability advantages that where envisioned for the open ball screw and nut drive assemblies according to the aforesaid U.S. Pat. No. 5,044,488, while avoiding the problems of lubricant and contamination of the ball screw surfaces and other maintenance problems that were encountered in the operation of devices according to the aforesaid U.S. Pat. No. 5,044,488, as were recognized in the aforesaid U.S. Pat. No. 5,472,077, which was subsequently granted in the name of the same inventor.

Accordingly, it is an object of the present invention to provide an improved lehr loader. More particularly, it is an object of the present invention to provide a lehr loader whose carriage drives are accurately controllable, readily lubricated and of low maintenance requirements, even in an environment of a glass container manufacturing plant.

For a further understanding of the present invention and the objects thereof, attention is directed to the drawing and the follow brief description thereof, to the detailed description of the preferred embodiment of the invention and to the appended claims.

BRIEF DESCRIPTION OF THE DRAWING

FIGS. 11 and 12 are elevational views, partly in cross-section, at an enlarged scale and at right angles to one another of another actuation device used in the lehr loader of FIGS. 1–5;

DETAILED DESCRIPTION OF THE PREFERRED EMBODIMENT

Figure 1:
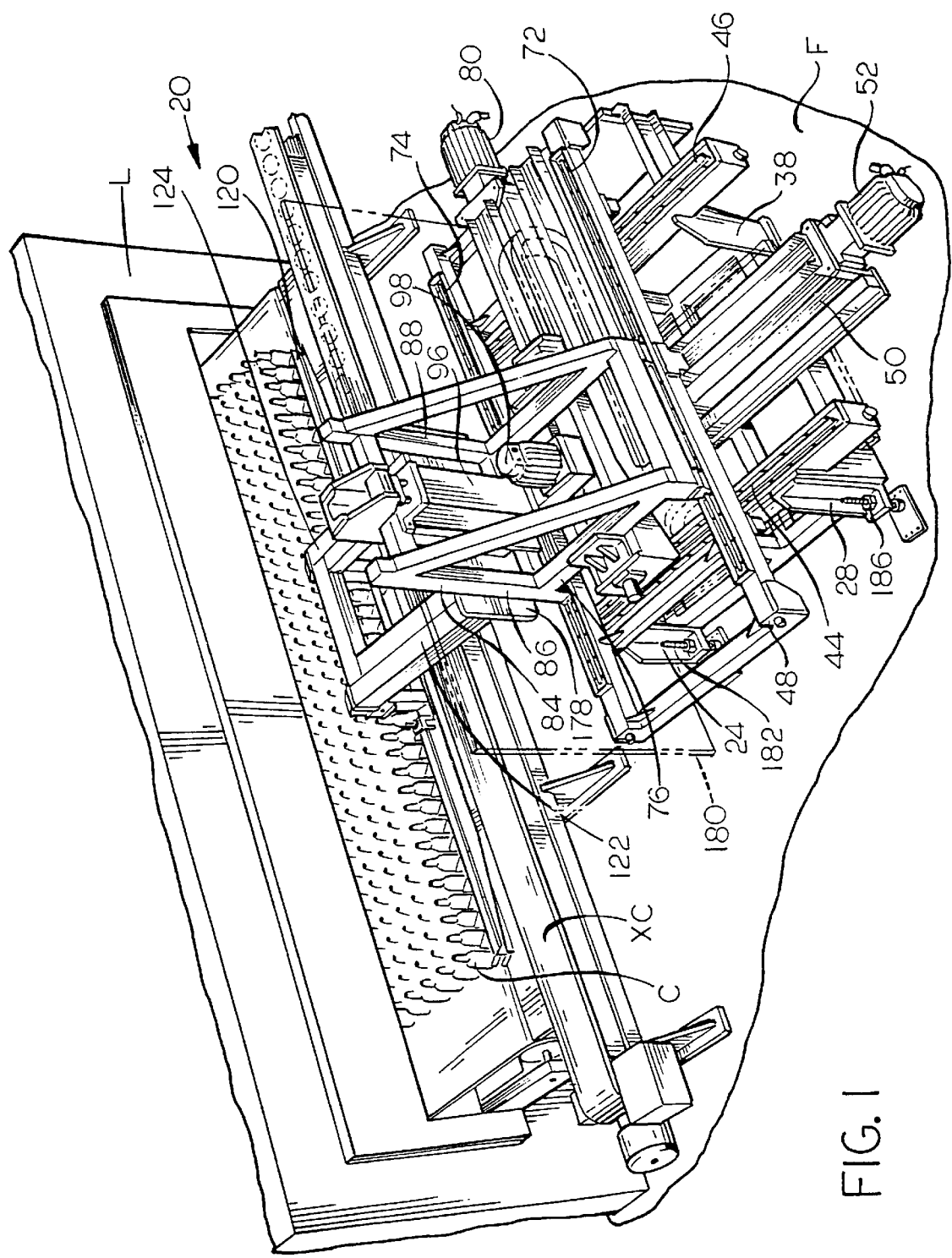
FIG. 1 is a fragmentary, perspective view of a lehr loader according to the preferred embodiment of the present invention.

A lehr loader according to the preferred embodiment of the present invention is generally indicated in the drawing by reference numeral 20. The lehr loader 20 includes a frame 22, which is made up of vertically extending legs 24,26,28, 30, and the legs 24, 26, 28, 30 are disposed in a rectangular array. The legs 24, 26 are joined to one another by transversely extending members 32, 34, the legs 28, 30 are joined to one another by transversely extending members 36, 38, the legs 24, 28 are joined to one another by longitudinally extending members 40, 42, and the legs 26, 30 are joined together by longitudinally extending members, not shown.

The frame 22 is provided with a spaced apart pair of longitudinally extending slides 44, 46, and a generally rectangular carriage 48 is slidably mounted on the slides 44, 46. The carriage 48 is caused to reciprocate on the frame 22, toward and away from an annealing lehr L or other processing unit, by a reversible linear actuator 50 that is driven by a reversible a.c. servo motor 52 mounted in alignment with the actuator 50.

Figure 10:
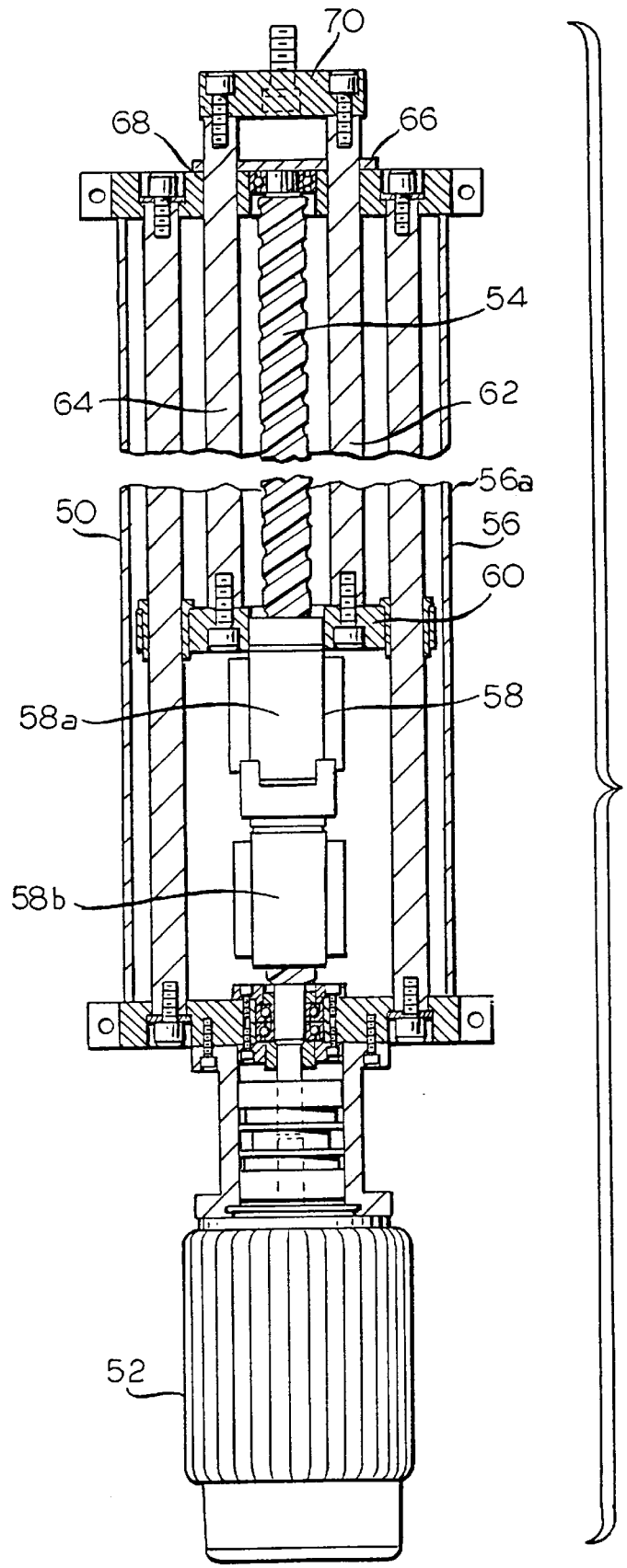
FIG. 10 is a plan view, partly in cross-section and at an enlarged scale, of an actuation device used in the lehr loader of FIGS. 1–5.

FIG. 10 illustrates the preferred embodiment of a linear actuator 50 for use in the practice of the present invention, with the servo motor 52 secured thereto in axial is alignment therewith, and in that case the linear actuator 50 is a ball screw mechanism with a reversible rotatable screw 54. The rotatable screw 54 is enclosed within an internally lubricated housing 56 that is secured to the frame 22, and the rotatable screw 54 rotates within a nut 58. Preferably, the nut 58 is made up of an opposed pair of nuts 58a, 58b to minimize backlash between the nut 58 and the rotatable screw. In any case, rotation of the screw 54 causes the nut 58 to advance or retract relative to the position of the servo motor 52, depending upon the direction of rotation of the screw 54.

Figure 4:
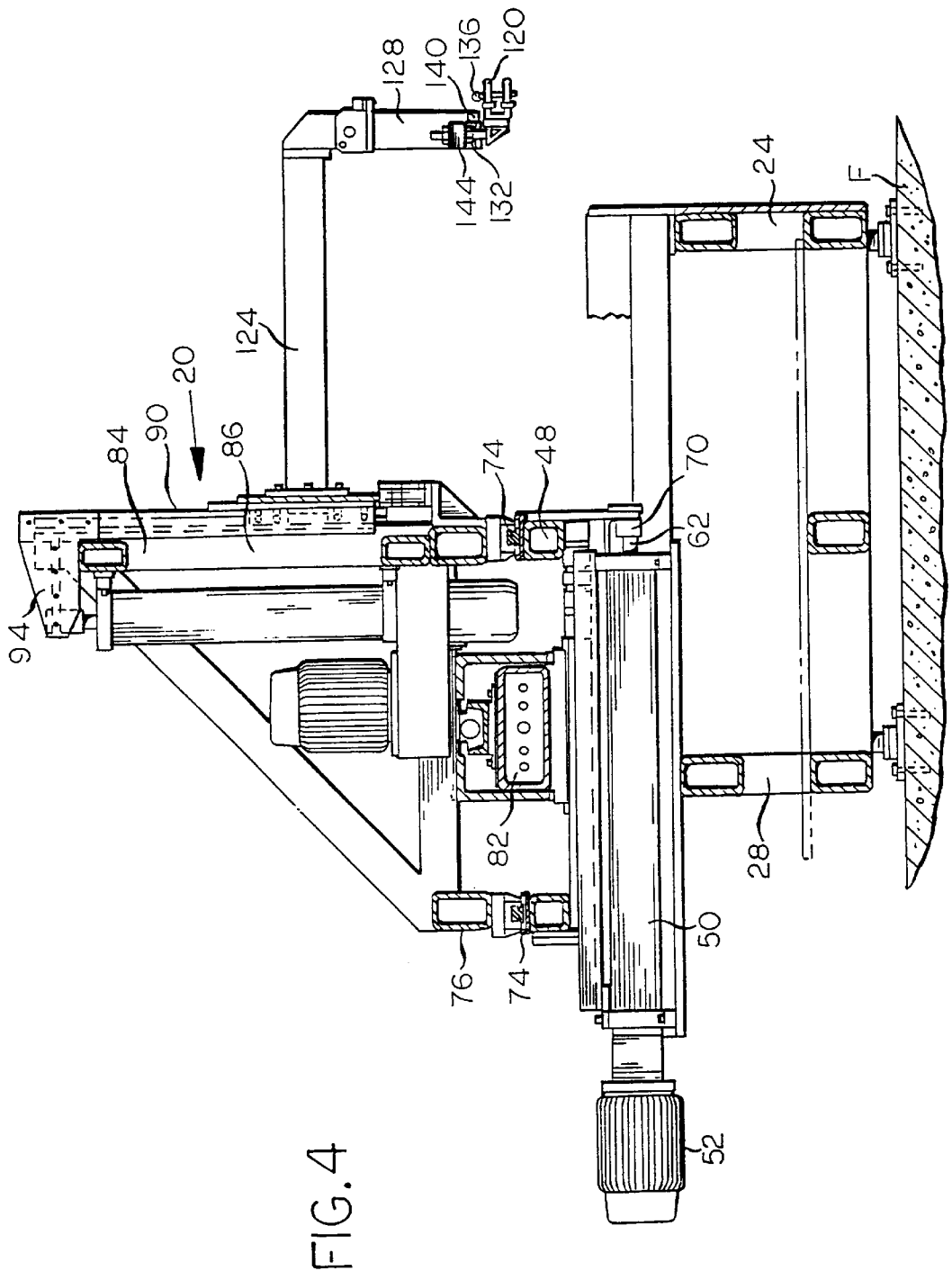
FIG. 4 is a sectional view taken on line 4—4 of FIG. 2.
Figure 5:
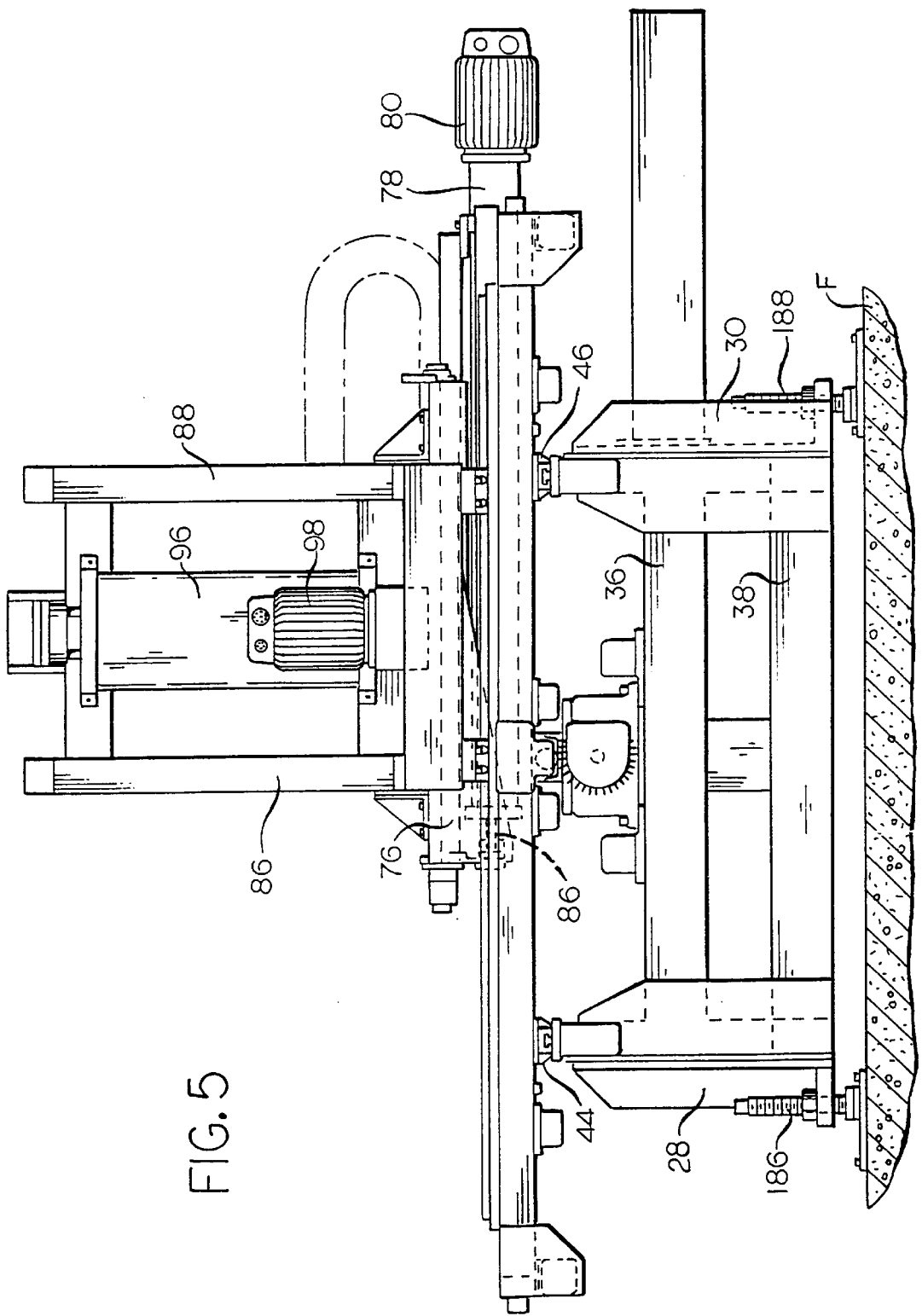
FIG. 5 is a fragmentary elevational view at an enlarged scale, of a portion of the lehr loader of FIGS. 1–4.

The nut 58 has a plate 60 secured to it, and the inner ends of a spaced apart pair of long, slender rods 62, 64 are secured to the plate 60. The outer ends of the rods 62, 64 extend beyond the housing 56 of the linear actuator 50 at all positions of the nut 58 within the housing 56, seals 66, 68 being provided in the housing 56 to sealingly accommodate the sliding motion of the rods 62, 64 with respect to the housing 56, respectively. The outer ends of the rods 62, 64 are secured to a plate 70, and the plate 70, in turn, is secured to the carriage 48, as shown in FIG. 4. Thus, reciprocation of the nut 58, as heretofore described, will cause the carriage 48 to reciprocate in a horizontal plane, toward or away from the lehr L. The use of the rods 62, 64 to longitudinally separate the nut 58 from the carriage 48 by the length of the rods 62, 64 desirably permits some degree of misalignment between the nut 58 and the carriage 48 due to the inherent flexibility of the rods 62, 64.

The linear actuator 50 of the enclosed ball screw type, as heretofore described, is available from E Drive Design, Inc. of Glastonbury, Conn., and has many advantages over an open ball screw linear actuator for use in reciprocating a carriage of a lehr loader, for example, an open ball screw linear actuator of the type disclosed in the aforesaid U.S. Pat. No. 5,044,488. Specifically, an enclosed ball screw mechanism permits continuous lubrication of the mating surfaces of the rotatable screw 54 and the nut 58, notwithstanding the tendency of the rotating screw 54 to sling lubricant outwardly therefrom due to centrifugal force when rotating at high speed, the housing 56 that encloses the screw 54 and the nut 58 protects their mating surfaces from contamination due to dust and debris that can be present in an industrial environment such as a glass container manufacturing plant, and the housing 56, together with the circulation of lubricant therethrough, protects the screw 54 and the nut 58 from overheating in an environment where they would otherwise be exposed to heat from proximity to heated containers and the inlet to the lehr L. Preferably, the housing 56 has an outer radiation shield 56a positioned therearound and spaced therefrom to reduce the transfer of heat to the interior of the linear actuator 50

A linear actuator of the enclosed ball screw type is disclosed in U.S. Pat. No. 4,500,805 (Swanson).

The carriage 48 is provided with a spaced apart pair of laterally extending slides 72, 74 and a carriage 76 is slidably mounted on the slides 72, 74. The carriage 76 reciprocates in a longitudinal direction with the carriage 48 and is caused to reciprocate in a lateral direction with respect to the carriage 48, from side to side of the annealing lehr L, by a reversible linear actuator 78 that is driven by a reversible a.c. servo motor. The linear actuator 78 preferably is an enclosed ball screw mechanism of the type described above with respect to the linear actuator 50, and has a housing 82 that is secured to the carriage 48 and a nut (not shown) that reciprocates within the housing 82 and transmits reciprocating force to a spaced apart location of the carriage 76 by a pair of long slender rods 84, 86 whose free ends extend beyond the housing 82.

The carriage 76 has a vertically extending portion 86 that is made up of a frame with a pair of spaced apart vertically extending members 84, 88, and the vertically extending members 86, 88 are provided with vertically extending slides 90, 92, respectively. A vertically extending carriage 94 is slidably mounted on the slides 90, 92 of the carriage 76 to be movable in a vertical plane with respect to the carriage 76 as the carriage 76 is movable laterally in a horizontal plane with respect to the carriage 48 and as the carriage 76 is movable longitudinally in a horizontal plane with the carriage 48. The carriage 94 is caused to reciprocate in a vertical plane, for reasons that will later be discussed more fully, by a reversible linear actuator 96 that is driven by a reversible a.c. servo motor 98.

FIGS. 11 and 12 illustrate the preferred embodiment of a linear actuator 96 for use in the practice of the present invention, with the servo motor 98 positioned out of alignment with the linear actuator 96 and parallel thereto to thereby reduce the overall height of the lehr loader 20. The linear actuator 96 is an enclosed ball screw mechanism with a reversible rotatable screw 100. The screw 100 is enclosed within an internally lubricated housing 102 that is secured to the vertically extended portion 86 of the carriage 76, and the rotatable screw 100 rotates within a nut 104. The rotation of the screw 100, thus, causes the nut 104 to advance or retract relative to the servo motor 98 depending upon the direction of rotation of the servo motor 98, whose torque is applied to the screw 100 by means of an enclosed drive assembly 106, such as a cogged timing belt drive assembly. Preferably, the housing 102 has an outer radiation shield 102a positioned therearound and spaced therefrom to reduce the transfer of heat to the interior of the linear actuator 96.

The nut 104 has a plate 108 secured to it, and the inner ends of a spaced apart pair of parallel, long slender rods 110, 112 are secured to the plate 108. The outer ends of the rods 110, 112 extend beyond the housing 102 of the linear actuator 96 at all positions of the nut 104 within the housing 102, seals 114, 116 being provided in the housing 102 to sealing accommodate the sliding motion of the rods 110, 112 with respect to the housing 102, respectively.

Figure 3:
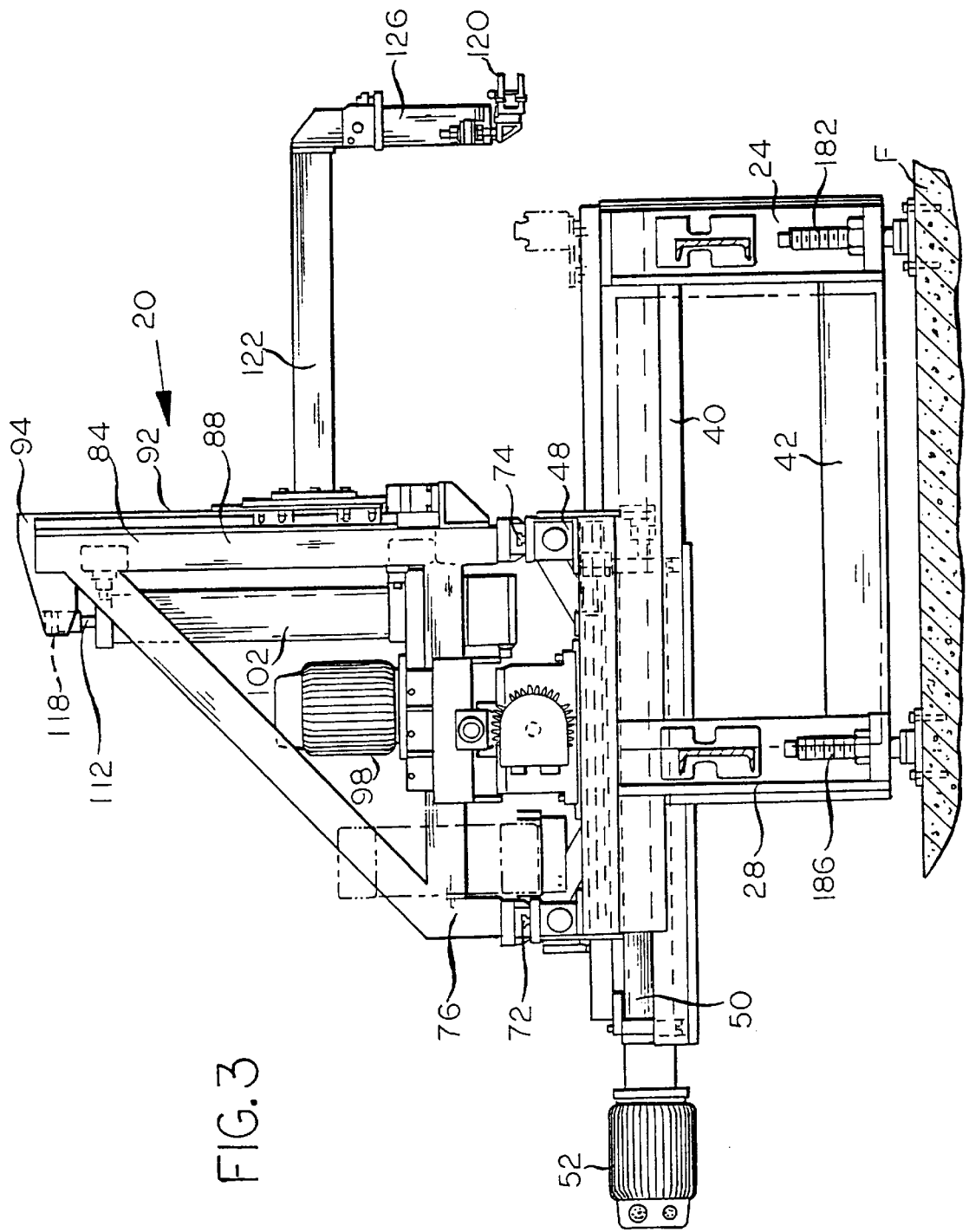
FIG. 3 is a side elevational view of the lehr loader of FIGS. 1 and 2.

The other ends of the rods 110, 112 are secured to a plate 118, and the plate 118, in turn, is secured to the carriage 94, as shown in FIG. 3. Thus, reciprocation of the nut 104, as heretofore described, will cause the carriage 94 to reciprocate in a vertical plane. The use of the rods 110, 112 to longitudinally separate the nut 104 from its attachment to the carriage 94 by the lengths of the rods 110, 112 desirably permits some degree of misalignment between the nut 104 and the carriage 94 due to the inherent flexibility of the rods 110, 112. A linear actuator 96 of the enclosed ball screw type, as described above, like the linear actuators 50, 78, as heretofore described, is available from E Drive Design, Inc. of Glastonbury, Conn. and has the functional advantages over an open ball screw linear actuator that were previously described specifically in reference to the linear actuator 50.

The carriage 94 has a laterally extending pusher bar 120 attached thereto, a pair of spaced apart, longitudinally extending beams 122, 124 with beams 126, 128 extending downwardly therefrom, respectively, being provided to properly position the pusher bar 120 with respect to the lehr L for the intended operation of the pusher bar 120.

Figure 2:
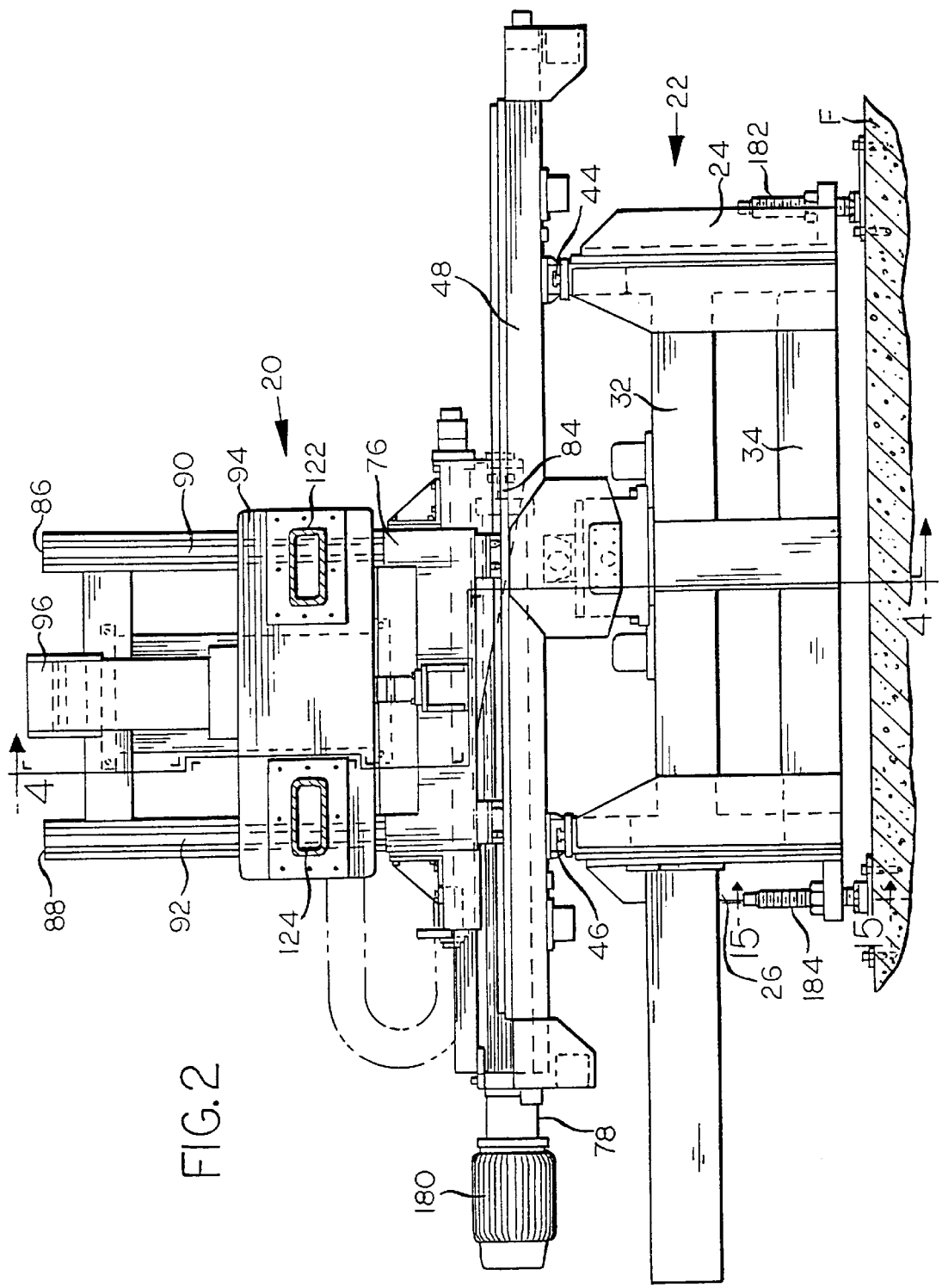
FIG. 2 is a front elevational view of the lehr loader of FIG. 1.

The cycle of operation of the lehr loader 20 begins with the carriage 48 retracted as far as possible from the lehr L, the carriage 76 positioned as far to the left as possible, in the configuration illustrated in FIG. 2, and with the carriage 94 in its lowermost position. Freshly formed glass containers C are presented in a linear array between the lehr loader 20 and the lehr L on and by way of an endless cross-conveyor XC. A row of containers C on the cross-conveyor XC is then advanced from the cross-conveyor XC by advancing the carriage 48 toward the lehr L, as heretofore described. During the advance of containers C to the lehr L, it is necessary to translate the carriage 76 to the right, as heretofore described, to keep incoming containers C on the cross-conveyor XC from colliding with the pusher bar 120. At the conclusion of the advance of a line of containers C into the lehr L, the pusher bar 120 is raised above the tops of incoming containers C on the cross-conveyor XC by raising the carriage 94 as heretofore described, and with cycles that at least partly overlap the raising of the carriage 94, the carriage 48 is retracted away from the lehr L to its start position and the carriage 76 is retracted to the left to its start position and, after the pusher bar 120 is retracted past the tops of the incoming containers C on the cross-conveyor XC, the carriage 94 is lowered to its start position.

Figure 6:
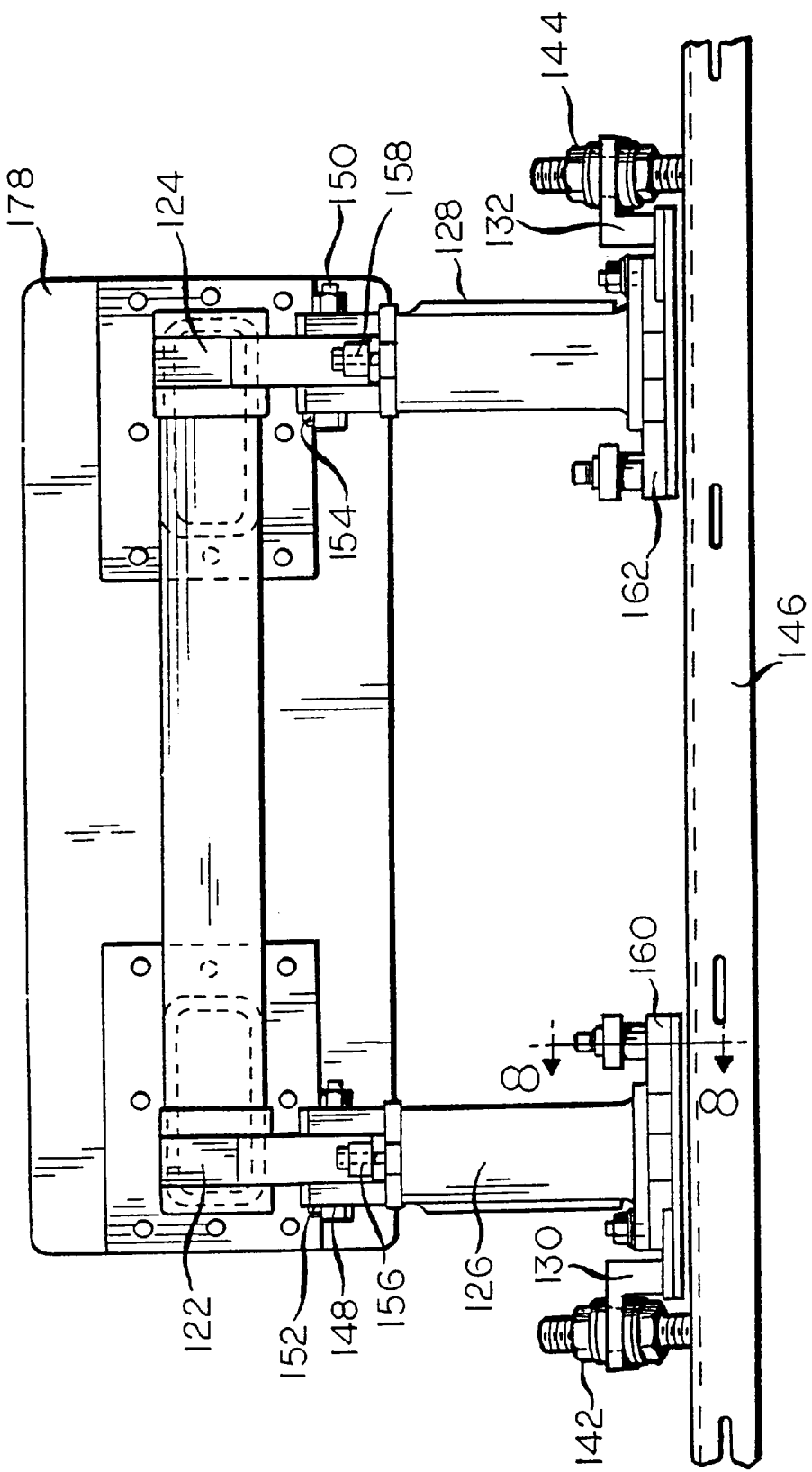
FIG. 6 is a front elevational view, at an enlarged scale, of a portion of the lehr loader of FIGS. 1–5.

The pusher bar 120 is connected to a laterally extending support bar 146 (FIG. 6), and the support bar 146 is connected to extensions 130, 132 of the downwardly extending beams 126, 128, respectively, by like removable pins 134, 136, respectively. The purpose of the removable connection of the pusher bar 120 to the beams 126, 128 is to permit rapid changing of a pusher bar 120, for example, due to a change in the diameter of the containers C being processed by the lehr loader 20. In that regard, the pusher bar 120 preferably is provided with a container engaging face with a plurality of spaced apart container engaging recesses, preferable defined by a plurality of spaced apart equilateral triangularly shaped attachments secured to the front face of the pusher bar 120, the recesses being sized and spaced in a manner designed for the processing of containers C of a given diameter. Thus, upon a change of the diameter in the containers C being processed by the lehr loader 20, it is important to be able to rapidly change the pusher bar 120 to one whose container engaging face is provided with recesses that are sized and spaced apart differently, and the connection of the pusher bar 120 to the beams 126, 128 by way of the support bar 146, as described, permits such a rapid change in the pusher bar 120.

Figure 7:
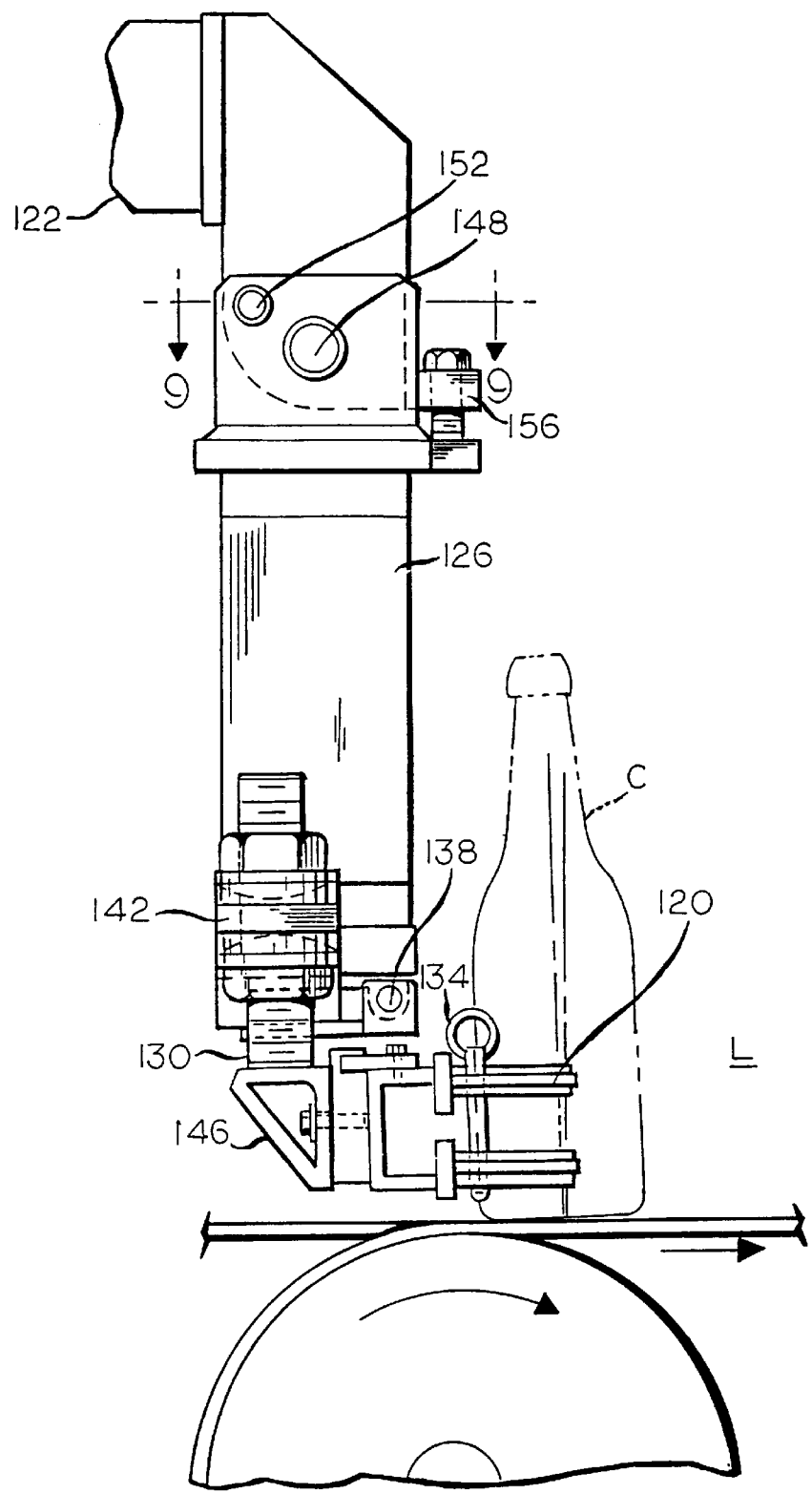
FIG. 7 is a side elevational view, at an enlarged scale, of a portion of the lehr loader of FIGS. 1–5.

The extensions 130, 132 are pivotably connected to the downwardly extended beams 126, 128, respectively, about axes 138, 140, respectively. Threaded adjusters 142, 144, respectively, are provided to permit adjustment of the angle of the pusher bar 120 with respect to containers C that it engages, preferably so that the pusher bar 120 engages the bottom portion of each container C slightly before it engages a higher portion of such container C to impart a slight tilt to the container C away from its direction of motion into the lehr L, as shown in FIG. 7.

The downwardly extending beams 126, 128 are pivotably connected to the longitudinally extending beams 122, 124, respectively, about axes 148, 150, respectively. In normal operation of the lehr loader 20, pivoting of the beams 126, 128 with respect to the beams 122, 124 about the axes 148, 150, respectively, is resisted by shear pins 152, 154, respectively, so that no such pivoting motion will occur. However, in the event of a blockage of the transfer of containers C into the lehr L, the shear pins 152, 154 will fail due to the increased load on the pusher bar 120, and the downwardly extending beams 126, 128 will thereupon rotate through a limited arc with respect to the beams 122, 124, respectively, to thereby retract the pusher bar 120 from engagement with containers C. To permit adjustment in the included angle normally existing between the downwardly extending beams 126, 128 with respect to the longitudinally extending beams 122, 124, respectively, adjustable stops 156, 158 carried by the beams 122, 124, respectively, are provided to assist in properly positioning the pusher bar 120 with respect to the containers C to be engaged thereby.

Figure 8:
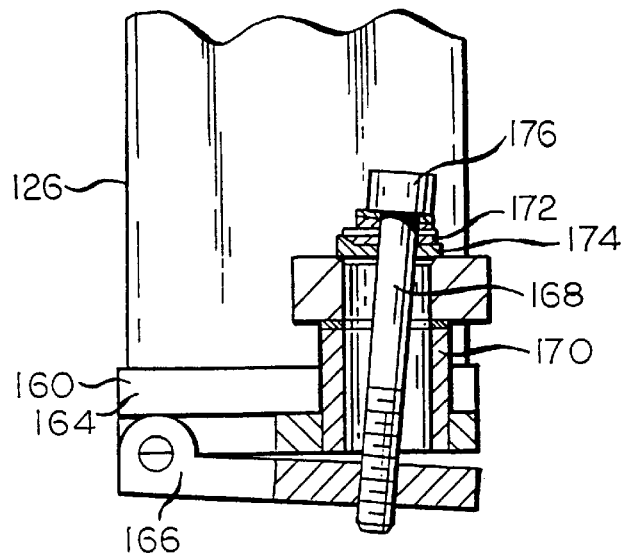
FIG. 8 is a sectional view, at an enlarged scale, taken on line 8—8 of FIG. 6.
Figure 9:
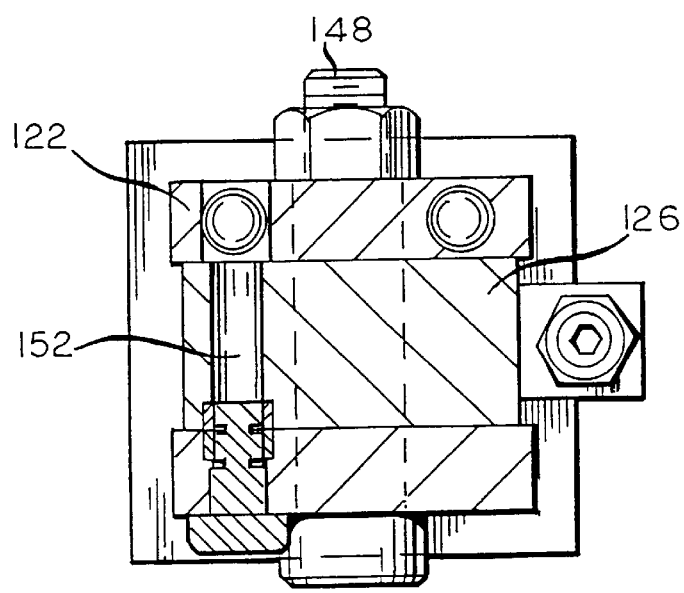
FIG. 9 is a section view taken on line 9—9 of FIG. 7.

To permit adjustment in the position of the support bar 146 and the pusher bar 120 with respect to the downwardly extending beams 126, 128, and thereby with respect to containers C to be engaged by the pusher bar 120, the extensions 130, 132 are connected to the beams 126, 128 by plate assemblies 160, 162, respectively. The plate assembly 160 for the downwardly extending beam 126 is illustrated in FIG. 8, and comprises a first plate 164 that is secured to the beam 126 and a second plate 166 that is pivotably secured to the first plate 164. The orientation of the second plate 166 with respect to the first plate 164 is controlled by a threaded fastener 168 that extends through a boss 170 in the first plate 164 to be threadably received in the second plate 166. A pair of tapered washers 172, 174 is positioned between a head portion 176 of the fastener 168 and the top of the boss 170. By varying the circumferential orientation of the washers 172, 174 with respect to one another, the angle of the threaded fastener 168 with respect to the downwardly extending beam 126 can be varied, to thereby vary the angular position of the support bar 146 and the pusher bar 120 with respect to containers C. The plate assembly 162 is not specifically illustrated in detail in the drawing, but its design is the same as that of the plate assembly 160.

To shield the linear actuator 96 from thermal radiation from the lehr L and the containers C being processed by the lehr loader 20, a radiation baffle 178 is secured to the carriage 94, preferably to the vertically extending portion of the carriage, preferably to the members 86, 88 thereof. Further, to protect many other portions of the lehr loader 20 from thermal radiation from the lehr L and the containers C, a fixed baffle 180 is positioned between the cross-conveyor XC and the portions of the lehr loader 20 beneath and to the rear of the longitudinally extending beams 122, 124 of the carriage 94.

Figure 15:
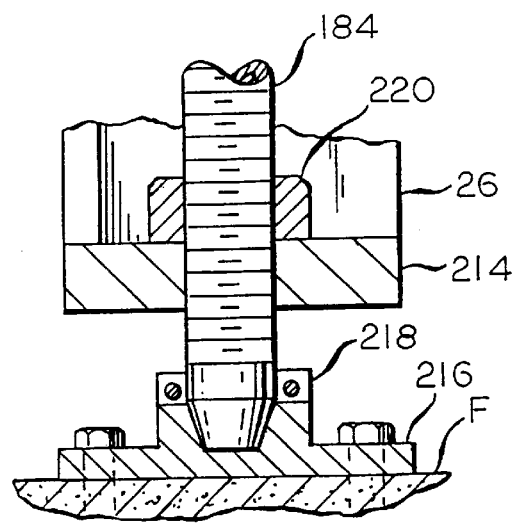
FIG. 15 is a sectional view taken on line 15—15 of FIG. 2.

The horizontally acting servo motors 52, 80 are capable of delivering high levels of torque during rapid acceleration of the carriages 48, 76, respectively, and are capable of braking quite rapidly during the rapid deceleration of such carriages. The loads resulting from such rapid acceleration and deceleration are quite substantial, and would tend to vibrate the legs of the frame 22 from their desired positions with respect to the lehr L unless properly compensated for in the installation of the frame 22. To effect such proper compensation, the legs 24, 26, 28, 30 of the frame 22 are mounted on the threaded members 182, 184, 186, 188, respectively. Members 182, 184, 186, 188, in turn, are securely anchored in a floor F of a glass container manufacturing plant where the lehr loader 20 is installed. Such an installation technique also permits making precise adjustments of the elevation of each of the legs 24, 26, 28, 30 of the frame 22 with respect to the floor F, and it also serves to isolate each of the servo motors of the lehr loader, namely the motors 52, 80 and 98, from the effects of any vibrations occurring in the floor F from any source. The anchoring of the leg 26 to the floor F by way of its threaded member 184 is specifically illustrated in FIG. 15 where the leg 26 is provided with a horizontal flange 214 through which the threaded member 184 passes. A free end of the threaded member 184 is received in a flange 216 that is bolted to the floor F, a split collar 218 being provided to permit adjustment of the position of the threaded member 184 with respect to the flange 216. The vertical position of the leg 26 with respect to the flange 216 is adjustably controlled by a nut 220 that threadably receives the threaded fastener 184 and bears against the flange 214.

Figure 13:
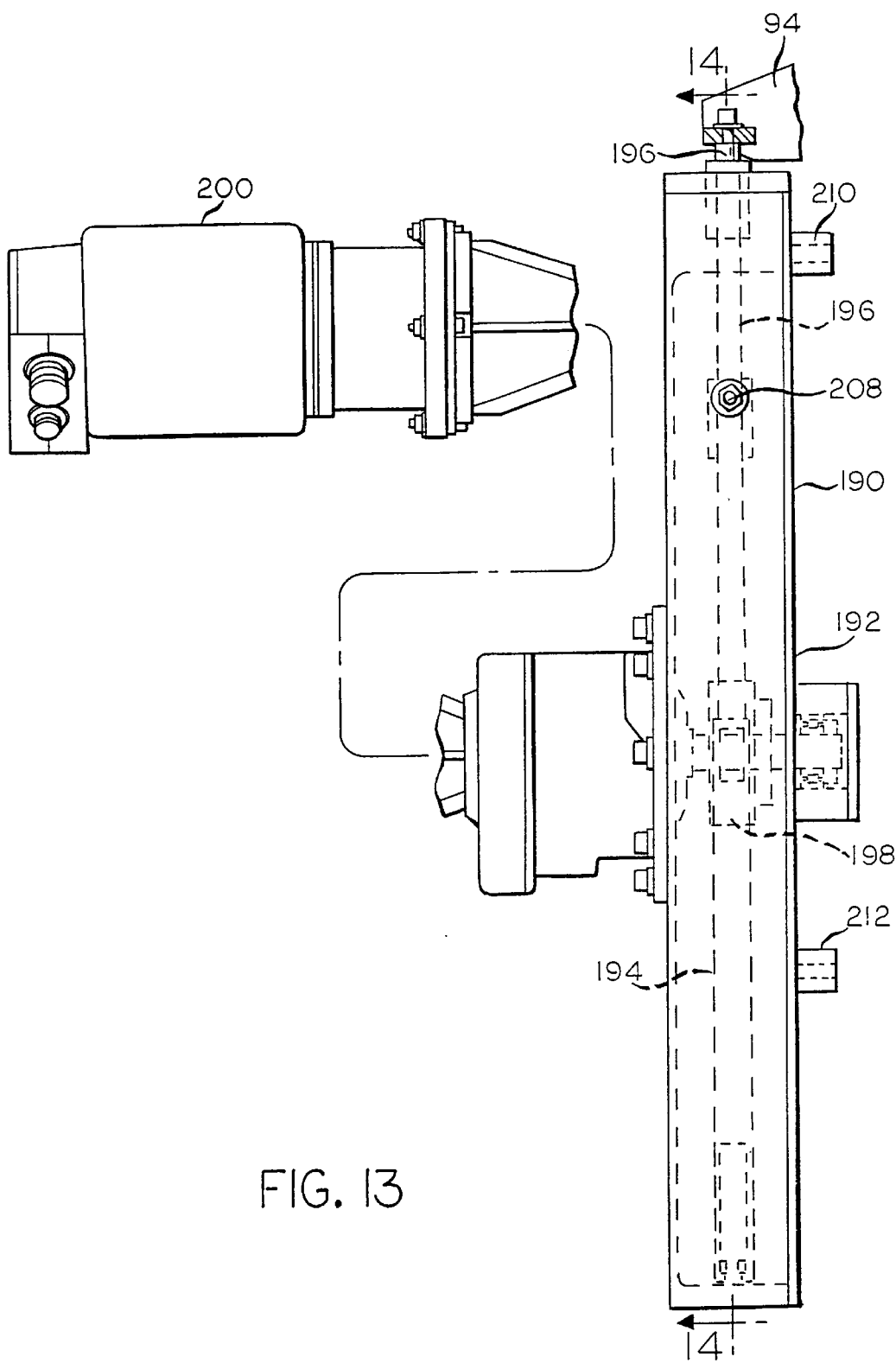
FIG. 13 is an elevational view, partly in cross-section, of an alternative embodiment of an actuation device for use in the lehr loader of FIGS. 1–5.
Figure 14:
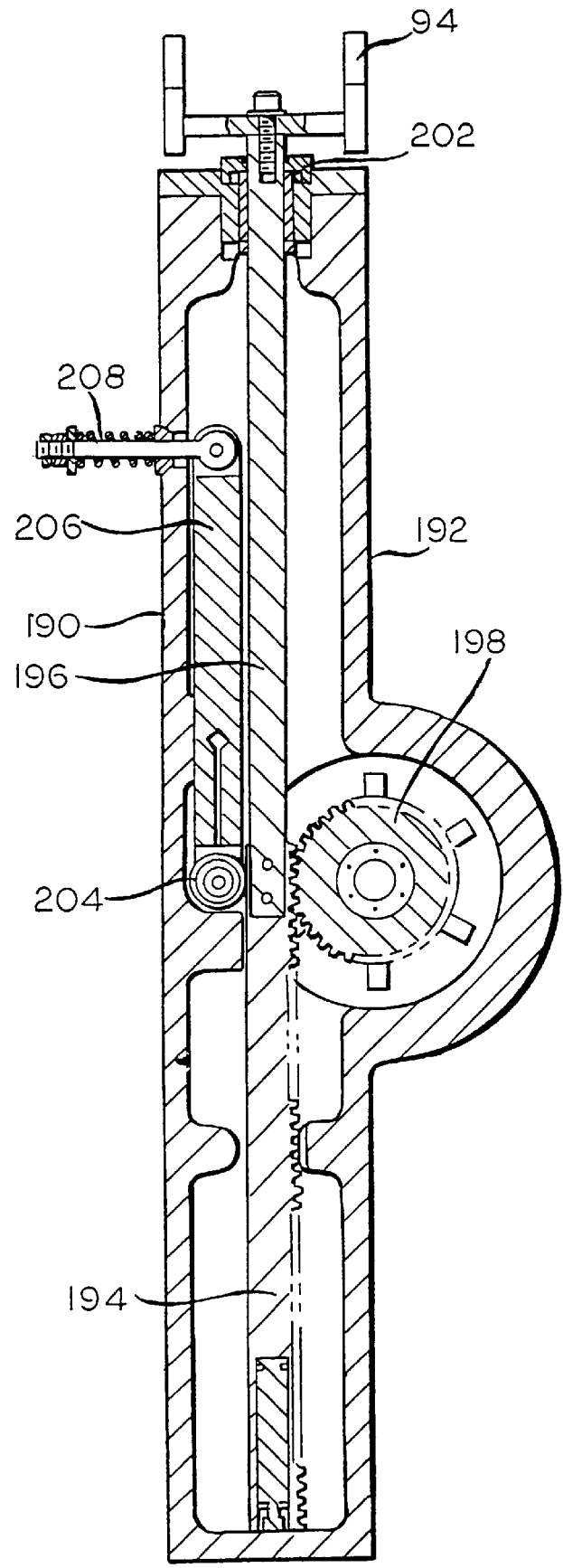
FIG. 14 is a sectional view taken on line 14—14 of FIG. 13.

If desired, the enclosed linear actuator 96 for the carriage 94 can be replaced by an enclosed linear actuator of the rack and pinion type 190 as illustrated in FIGS. 13 and 14. The linear actuator 190 has a housing 192 with a toothed rack 194 positioned within the housing 192. The rack 194 has the inner end of an extension 196 secured to an end thereof, and the outer end of the extension 196 extends beyond the housing 192 and is secured to the carriage 94. The teeth of the rack 194 engage the teeth of a toothed pinion 198, and the pinion 198 is caused to reversibly rotate by virtue of its coaxial connection to a reversible a.c. servo motor 200. The housing 192 is provided with a seal 202 to sealingly accommodate movement of the extension 196 with respect to the housing 192. Proper engagement of the rack 194 and the pinion 198 is provided by a roller 204 that engages the reverse side of the rack 194 in radial alignment with the axis of rotation of the pinion 198, the roller 204 being rotatably mounted at an end of a lever arm 206. The load of the roller 204 on the rack 196 may be adjusted by an adjustment mechanism 208 that acts against the lever arm 206 at a location away from the location of the roller 204. The housing 192 of the linear actuator 190 is provided with inlet and outlet connections 210, 212, respectively, to permit lubricating oil to be continuously circulated through the housing 192, preferably after such lubricating oil has been filtered and cooled, at least by circulating it through lines that are away from the thermal effects of the annealing lehr L.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

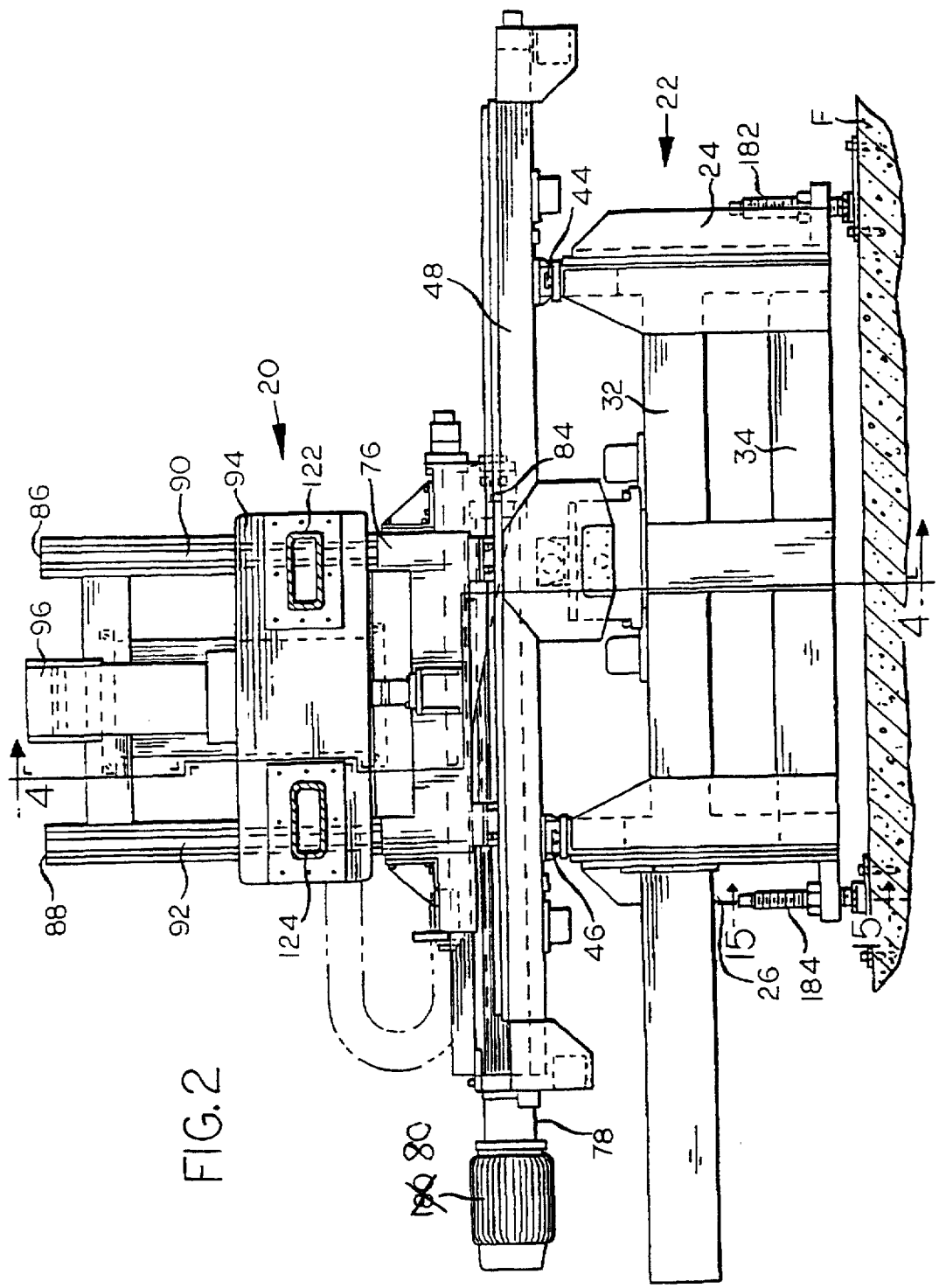

What is claimed is:

1. Apparatus for tansferring a plurality of articles arranged in a straight line on a conveyor transversely of the conveyor into a processing unit, said apparatus comprising:

a first carriage, said first carriage being movable in a horizontal plane along a first horizontal axis toward and away from the processing unit;

means for supporting the first carriage at a predetermined elevation with respect to the processing unit;

first linear actuator means for reciprocating said first carriage along the first axis;

first motor means for driving said first linear actuator means;

a second carriage, said second carriage being slidably supported on said first carriage for reciprocation with said first carriage and for reciprocation with respect to said first carriage along a second axis extending transversely of the direction of the first axis;

second linear actuator means for reciprocating said second carriage along the second horizontal axis;

second motor means for driving said second linear actuator means;

a third carriage, said third carriage being slidably supported on said second carriage for reciprocation with said second carriage and said first carriage and for reciprocation with respect to said second carriage along a vertical axis;

third linear actuator means for reciprocating said third carriage along the vertical axis;

third motor means for driving said third linear actuator means; and pusher bar means carried by said third carriage for transferring the plurality of articles from the conveyor into the processing unit upon motion of said first carriage toward the processing unit;

wherein at least one of said first linear actuator means, said second linear actuator means and said third linear actuator means is an enclosed linear actuator means.

2. Apparatus according to claim 1 wherein each of two of said first linear actuator means, said second linear actuator means and said third linear actuator means is an enclosed linear actuator means.

3. Apparatus according to claim 1, wherein the plurality of articles comprises a plurality of freshly formed glass containers, wherein the processing unit comprises an annealing lehr, and wherein the conveyor comprises a cross-conveyor that is movable to present freshly formed glass containers before an entrance into the annealing lehr.

4. Apparatus according to claim 1 wherein said at least one of said first said at least one of said linear actuator means, said second linear actuator means and said third linear actuator comprises:

a housing secured to said means for supporting;

a screw within said housing, said screw being reversibly rotatable with respect to said housing;

a nut within said housing, said screw being rotatable within said nut to cause said nut to reciprocate within said housing;

at least one long slender rod having an inner end positioned within said housing and an outer end positioned outside said housing;

means for connecting said inner end of said at least one long slender rod to said nut to cause said at least one long slender rod to reciprocate with said nut; and means for connecting said outer end of said at least one long slender rod to said at least one of said first carriage, said second carriage and said third carriage to cause said at least one of said first carriage said second carriage and said third carriage to reciprocate with said at least one long slender rod.

5. Apparatus according to claim 1 wherein at least one of said first motor means, said second motor means and said third motor means for driving said one of said first linear actuator means, said second linear actuator means and said third linear actuator means comprises a reversible a.c. servo motor.

6. Apparatus according to claim 4 wherein said reversible a.c. servo motor has an output shaft, and wherein said output shaft is positioned coaxially with said screw.

7. Apparatus according to claim 4 wherein said at least one long slender rod comprises first and second spaced apart long slender rods, said screw being positioned between said first and second long slender rods.

8. Apparatus according to claim 2 wherein said other of said two of said first linear actuator means, said second linear actuator means and said third linear actuator means comprises:

a second housing secured to one of said first carriage and said second carriage and said third carriage;

a second screw within said second housing, said screw being reversibly rotatable with respect to said second other of said two of said linear actuator means and said third linear actuator means comprises;

a second nut within said second housing of said second screw, said second screw being rotatable within said second nut of to cause said second nut of to reciprocate within said second housing;

a second at least one long slender rod having an inner end positioned within said second housing and an outer end positioned outside said second housing;

means for connecting said inner end of said at second at least one long slender rod of said second linear actuator means to said second nut to cause said second at least one long slender rod to reciprocate with said second nut; and means for connecting said outer end of said second at least one long slender rod of said second linear actuator means to one of said first carriage, said second carriage and said third carriage to cause said one of said first carriage said second carriage and said third carriage to reciprocate with said at least one long slender rod.

9. Apparatus according to claim 8 wherein said motor means for said other of said two of said first linear actuator means, said second linear actuator means and said third linear actuator means comprises a second reversible a.c. servo motor.

10. Apparatus according to claim 9 wherein said second a.c. servo motor has an output shaft, said output shaft of said second reversible a.c. servo motor being positioned coaxially with said screw of said second linear actuator means.

11. Apparatus according to claim 10 wherein said second at least one long slender rod comprises first and second spaced apart long slender rods, said second screw being positioned between said first and second long slender rods within said second housing.

12. Apparatus according to claim 1 and further comprising:

a pusher bar; and shear pin means for releasably and pivotably connecting said pusher bar to said third carriage.

13. Apparatus according to claim 2 and further comprising:

a radiation baffle secured to said first carriage.

14. Apparatus according to claim 13 and further comprising:

a fixed baffle positioned between the cross-conveyor and said first and second carriages.

15. Apparatus according to claim 4 wherein said one of said first linear actuator means said second linear actuator means and said third linear actuator means further comprises:

a radiation shield positioned around said housing and spaced from said housing to reduce the transfer of heat to the interior of said first one of said linear actuator means said second linear actuator means and said third linear actuator means.

16. Apparatus according to claim 8 and further comprising:

a second radiation shield positioned around said second housing and spaced from said second housing to reduce the transfer of heat to the interior of said second housing.

* * * * *

UNITED STATES PATENT AND TRADEMARK OFFICE
CERTIFICATE OF CORRECTION

PATENT NO. : 6,035,995
DATED : March 14, 2000
INVENTOR(S) : Leidy et al.

It is certified that error appears in the above-identified patent and that said Letters Patent is hereby corrected as shown below:

Sheet 2 of 13, Fig. 2, kindly change reference numeral 180 to 80 as indicated on the attached drawing.

Signed and Sealed this

Sixteenth Day of October, 2001

Attest:

NICHOLAS P. GODICI
Attesting Officer  Acting Director of the United States Patent and Trademark Office